(12) United States Patent
Fujii et al.

(10) Patent No.: US 6,306,327 B1
(45) Date of Patent: *Oct. 23, 2001

(54) PRODUCING METHOD OF A THERMOPLASTIC RESIN SHEET AND PRODUCING APPARATUS THEREFOR

(75) Inventors: Atsushi Fujii; Akira Funaki; Tohru Yukumoto; Katsumi Uchiyama, all of Sodegaura (JP)

(73) Assignee: Idemitsu Petrochemical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,326

(22) Filed: Aug. 14, 1998

Related U.S. Application Data

(63) Continuation-in-part of application No. 08/748,569, filed on Nov. 13, 1996, now abandoned.

(30) Foreign Application Priority Data

Nov. 14, 1995 (JP) .................................................. 7-295649

(51) Int. Cl.$^7$ .................................................. B29C 47/88
(52) U.S. Cl. ................ 264/210.2; 264/237; 264/211.12; 425/373
(58) Field of Search .................................. 264/237, 348, 264/173.1, 210.2, 172.19, 211.12, 178 R, 210.5, 175, 216, 280, 212; 425/327, 371, 373

(56) References Cited

U.S. PATENT DOCUMENTS 3,175,026 * 3/1965 James .

(List continued on next page.)

FOREIGN PATENT DOCUMENTS

| 33 19 279 | 12/1984 | (DE) . |
| 51-73565 | * 6/1974 | (JP) . |
| 59-150 726 | 8/1984 | (JP) . |
| 3-6919 | 1/1991 | (JP) . |
| 6-23825 | * 2/1994 | (JP) . |
| 6-55613 | 3/1994 | (JP) . |
| 6-166089 | 6/1994 | (JP) . |
| 6-170919 | 6/1994 | (JP) . |

*Primary Examiner*—Jan H. Silbaugh
*Assistant Examiner*—Mark Eashoo
(74) *Attorney, Agent, or Firm*—Flynn, Thiel, Boutell & Tanis, P.C.

(57) ABSTRACT

A producing apparatus is used, in which a metallic endless belt having a mirror face is wound on and extends between a first cooling roller covered with an elastic member and a second cooling roller, and a third cooling roller having a mirror face on its surface and touching the first cooling roller through a molten thermoplastic resin sheet and the endless belt oriented therebetween to hold the molten thermoplastic resin sheet pressed with the endless belt. While the temperature of the third cooling roller and the endless belt directly touching the molten thermoplastic resin sheet is retained at less than 50° C. and more than the dew-point, the molten thermoplastic resin sheet is guided into the area between the first and third cooling rollers to touch the endless belt, touching the first cooling roller, and the third cooling roller at approximately the same time, and the molten thermoplastic resin sheet is touch-rolled on the face and cooled by the first and third cooling rollers along a nip width of more than or the same as 5 mm during the elastic deformation of the elastic member, caused by a pressing force between the first and third cooling rollers, and subsequently, the molten thermoplastic resin sheet is cooled by touch-rolling the face to the third cooling roller with the endless belt.

11 Claims, 5 Drawing Sheets

U.S. PATENT DOCUMENTS

| | | | |
|---|---|---|---|
| 3,345,447 | * | 10/1967 | Grant . |
| 3,852,387 | * | 12/1974 | Bortnick et al. .................. 264/40 |
| 4,012,188 | * | 3/1977 | Lemelson ...................... 425/373 |
| 4,311,657 | * | 1/1982 | Koster ........................... 264/171 |
| 4,548,778 | * | 10/1985 | Fujii ............................. 264/180 |
| 4,859,392 | * | 8/1989 | Vetter ........................... 264/166 |
| 5,149,481 | * | 9/1992 | Gross et al. .................. 264/210.2 |
| 5,204,037 | | 4/1993 | Fujii ............................ 264/172.19 |
| 5,211,899 | * | 5/1993 | Fujii ............................ 264/180 |
| 5,286,436 | * | 2/1994 | Funk et al. .................. 264/210.2 |
| 5,658,514 | * | 8/1997 | Fujii et al. ................... 264/210.2 |

* cited by examiner

PRODUCING METHOD OF A THERMOPLASTIC RESIN SHEET AND PRODUCING APPARATUS THEREFOR

This is a continuation-in-part of U.S. Ser. No. 08/748 569, filed Nov. 13, 1996, now abandoned

BACKGROUND OF THE INVENTION

1. Field of the Invention

This invention relates to a method and an apparatus for producing a thermoplastic resin sheet, in which the obtained polypropylene resin sheet or film can be used for the packaging of food, medicine and so on.

2. Description of the Related Art

Of late years, as a transparentizing art of sheet (or film) made out of polypropylene resin, various processes with the use of a metallic endless belt have been proposed.

The greatest advantage of the use of the metallic endless belt is the point that high-glossing of both faces of the sheet can be effectively obtained to continuously transfer a mirror face of the metallic endless belt onto the surface of the sheet.

In order to increase the transparency of the polypropylene resin sheet, however, in addition to the aforementioned high-glossing, it is required that haze (the degree of cloud) inside the sheet is reduced to a low level.

Conventionally, various methods and apparatus for improving the transparency have been proposed.

For example, according to Japanese Patent Application Laid-open No. 6-170919, an apparatus for cooling and solidifying a fused sheet is disclosed, in which the metallic endless belt is provided to be wound on and between a metal roller and an elastic roller, covered with an elastic body on its surface, and after the sheet is guided into the area between the elastic roller and the cooling roller through the metallic endless belt, the sheet is, continuously, cooled while being pressed to a part of the circumference of the cooling roller.

In this case of the apparatus, the effect of immediately cooling the sheet pressed by the cooling roller and the metallic endless belt is insufficient, and in addition, hardness of the elastic body of the elastic roller is higher, so that the sheet is not touch-rolled on its face, with the result that a resin bank is produced or a fine transparency of the sheet cannot be obtained.

In Japanese Patent Application Laid-open No. 6-166089 and Japanese Patent Application Laid-open No. 6-170919, a method for cooling the sheet using the same method after the metallic endless belt is provided to be wound on and between the metal roller and the elastic roller covered with the elastic body on its surface is disclosed, however, the cooling temperature is higher and hardness of the elastic body is higher, so that the immediate cooling effect is insufficient, with the result that the transparent polypropylene sheet cannot be obtained without the use of raw materials consisting of a nucleating agent.

Further, according to Japanese Patent Application Laid-open No. 6-55613, a producing method of a thermoplastic resin sheet is disclosed, in which the sheet of the fusing state, consisting of a nucleating agent or the like, is guided into an area between the cooling roller and the metallic endless belt, and after the sheet is moved while being touched to the cooling roller and the metallic endless belt, the sheet is pressed against the cooling roller from the inside of the metallic endless belt by the aforementioned cooling roller.

In this case of the producing method, the immediate cooling of the sheet starts after the sheet is sandwiched between the cooling roller and the metallic endless belt, so that at the starting point of the immediate cooling, the face pressure is insufficient, with the result that it is difficult to obtain a fine effect of the immediate cooling and a fine surface gloss on the sheet. As a result, the transparency has tried to be improved by adding a nucleating agent or the like, but the degree of transparency may be insufficient if the nucleating agent or the like is not added.

SUMMARY OF THE INVENTION

A first aspect of the present invention is a producing method of a thermoplastic resin sheet, using a producing apparatus in which a metallic endless belt having a mirror face on the surface is provided to be wound on and between a first cooling roller, covered with an elastic member on the surface, and a second cooling roller, and a third cooling roller, having a mirror face on the surface and touching the first cooling roller through a molten thermoplastic resin sheet and the metallic endless belt, is provided to hold the molten thermoplastic resin sheet pressed with the metallic endless belt, which is characterized by guiding the molten thermoplastic resin sheet into the area between the first and third cooling rollers to touch the metallic endless belt, touching the first cooling roller, and the third cooling roller at approximately the same time, while the temperature of the metallic endless belt, directly touching the molten thermoplastic resin sheet, and the third cooling roller is retained to be less than 50° C. and more than the dew-point; touch-rolling the face and cooling the molten thermoplastic resin sheet along a nip width (a length in MD (machine direction) of an elastically deformed area of the elastic member) of more than or the same as 5 mm between the first and third cooling rollers while the elastic member is elastically deformed by a pressing force between the first and third cooling rollers; and cooling, subsequently, the molten thermoplastic resin sheet by touch-rolling the molten thermoplastic resin sheet on the face against the third cooling roller by the metallic endless belt to cool.

The aforementioned molten thermoplastic resin sheet is a thermoplastic resin sheet just after being formed by being extruded from an extruder.

The molten thermoplastic resin sheet in the present invention should be recognized as to also mean a film-state molten thermoplastic resin, too.

As the preferable thermoplastic resin, polyethylene, polypropylene, polyvinyl, chloride, polyvinyl, alcohol, polyethylene terephthalate, polyarylate, polyethylene-2,6 naphthalate, polyethylene- $\alpha$, $\beta$, bis (2-chlorophenoxyethane-4, 4'-dicarboxylate), polyphenylene oxide, polyester, polyphenylene sulfide, polyether ether ketone, aromaticpolyamide, polyarylate, polyimide, polyamide imide, polyether imide, syndiotactic polystyrene, biphenylether ketone, or the like can be used.

The recommended thermoplastic resin is a polypropylene resin.

As the aforementioned polypropylene resin, a homopolymer of polypropylene, a copolymer (random, block) with ethylene, a composition thereof or the like can be used. A random copolymer with ethylene is especially outstanding in the transparency. Incidentally, in the resin, a nucleating agent, it may consist of a sorbitol type, benzoic aluminum type, sodium type or the like.

And the sheet may be a single layer of thermoplastic resin or multi-layers including a layer of thermoplastic resin.

In the present invention, when the temperature of the metallic endless belt and the roller in order to cool the molten thermoplastic resin sheet exceeds 50° C., a fine transparency cannot be obtained. More preferably, it is less than 30° C. Further, when it is lower than the dew-point, a water-droplet spot is produced on the sheet.

By guiding the molten thermoplastic resin sheet into the area between the first and third cooling rollers to touch the metallic endless belt, touching the first cooling roller, and the third cooling roller at approximately the same time, the molten thermoplastic resin sheet can be touch-rolled and cooled at the same time, resulting in the improved transparency of the thermoplastic resin sheet. It can be assumed, when the molten thermoplastic resin sheet is touched earlier to either the metallic endless belt or the cooling roller, before the mirror face is transferred onto both faces of the sheet, the cooling and caking of the molten thermoplastic resin sheet is advanced.

In the present invention, it is advisable that the degree of the surface roughness of the mirror face of the metallic endless belt and the roller is less than 0.5 S, more preferably less than 0.4 S (Rmax).

As for the material of the endless belt, stainless, carbon steel, titanium alloy or the like can be used. Preferably, martensitic precipitation hardening stainless steel (such as SUS or type) or maraging steel, with fatigue limit against alternating stress (average stress=0) is more than ±600 N/mm$^2$, preferably more than 650 N/mm$^2$. The thickness of the endless belt is selective, more preferably more than 0.3 mm from view of strength, and not exceeding 1 mm considering flexibility. Preferably, the endless belt is a seamless belt. Furthermore, it is preferable for the thickness (t) of the belt and the diameter (d) of the roller to be defined as $500 \leq d/t \leq 900$.

Being thus structured, the size of the belt mechanism body can be reduced, thereby reducing the cost and space for the belt mechanism and facilitating handling thereof (in an ordinary belt mechanism a belt of more than 1 mm and a roller having diameter of $1000 \leq d/t$ (d: diameter of the roller, t: thickness of the belt) are employed).

As for the material of the aforementioned elastic member, fluorine-type rubber, silicone-type rubber, EPDM or the like can be used. It is advisable that the thickness of the elastic member is more than 3 mm in order to obtain fine face pressure with the elastic deformation.

Preferably, the sheet is separated after being moved out from the nip between the third cooling roller and the belt with the sheet retained on the belt. The sheet is preferably cooled on the belt until the surface temperature thereof reaches 50° C. when being separated.

In accordance with such process, the separation is conducted after the sheet being sufficiently cooled, thereby preventing a damage on the sheet.

On the other hand, it is also preferable to separate the sheet after being moved out from the nip. Being thus structured, damage on the surface of the belt can be prevented even when (1) a resin of which crystallization comes fast or (2) a resin being largely contracted by crystallization, is employed.

In the present invention, the aforementioned molten thermoplastic resin sheet is touch-rolled on its face and cooled with the elastic deformation of the aforementioned elastic member, resulting in the improved efficiency of the transfer of the mirror face and the cooling.

A second aspect of the present invention is a producing method of the thermoplastic resin sheet, using a producing apparatus in which a first metallic endless belt, having a mirror face, wound on and between a first cooling roller, covered with an elastic member on the surface, and a second cooling roller and a second metallic endless belt, having a mirror face, wound on and between a third cooling roller and a fourth cooling roller are provided to run along side each other to sandwich a molten thermoplastic resin sheet, and an added-pressure means for both metallic endless belts is provided in a section where both metallic endless belts run along side each other to sandwich the molten thermoplastic resin sheet, which is characterized by guiding the molten thermoplastic resin sheet into the area between the first and second metallic endless belts to touch the first endless belt, touching the first cooling roller, and the second metallic endless belt, touching the third cooling roller, at approximately the same time while the temperature of the metallic endless belt directly touching the molten thermoplastic resin sheet is retained to be less than 50° C. and more than the dew-point; touch-rolling the face and cooling the molten thermoplastic resin sheet by the first and third cooling rollers while the elastic member is elastically deformed along a nip width (a length in MD (machine direction) of an elastically deformed area of the elastic member) of more than or the same as 5 mm by a pressing force between the first and third cooling rollers; and cooling, subsequently, the molten thermoplastic resin sheet by touch-rolling the formed molten thermoplastic resin sheet on the face by the added-pressure means in a section where both metallic endless belts run along side each other.

In the second aspect of the present invention, the third cooling roller may be covered with the elastic member on the surface of the third cooling roller.

That is to say, the first and third cooling rollers of the invention are covered with the elastic member on both surfaces.

In the second aspect of the present invention, the added-pressure means for both metallic endless belts can be at least a pair of rollers located to sandwich both metallic endless belts.

The number of pairs of rollers can be decided based on the length between the first and second rollers and between the third and fourth rollers.

The aforementioned pair of rollers may be located at a position to be opposed to each other by sandwiching both metallic endless belts or may be located at a position to be away from each other not to oppose to each other by sandwiching both metallic endless belts.

In the second aspect of the present invention, the added-pressure means for both metallic endless belts may be a roller located to cause both metallic endless belts to curve between the first and second rollers or between the third and fourth rollers.

Both metallic endless belts are selectively located to curve between the first and second rollers or between the third and fourth rollers, and in either case, the same effect of the added-pressure can be obtained.

In the first aspect of the present invention or the second aspect of the present invention, it is advisable that when the molten thermoplastic resin sheet is touch-rolled on the face with the elastic deformation of the elastic member, the face pressure is defined as 0.1 MPa-20.0 MPa; and when the molten thermoplastic resin sheet is touch-rolled on the face without the elastic deformation of the elastic member, the face pressure is defined as 0.01 MPa-0.5 MPa.

When the face pressure is lower than 0.1 MPa or 0.01 MPa described above, the efficiency of transfer of the mirror face and the cooling become reduced. When the face pressure is higher than 20.0 MPa or 0.5 MPa described above, tension of the belt is higher, so that it is not preferable from the view of the life of the belt.

Preferably the hardness of the elastic member is less than 60 degrees (in accordance with JIS K6301 A) and the thickness thereof is less than 5 mm. Being thus structured, elastic deformation along a nip width of more than or the same as 5 mm can be easily and securely conducted.

A producing apparatus of a thermoplastic resin sheet, relating to a third aspect of the present invention, is characterized by providing a metallic endless belt having a mirror face, which is wound on and between a first cooling roller, covered with an elastic member on the surface of the metallic endless belt, and a second cooling roller; and a third cooling roller having a mirror face and touching the first cooling roller through a molten thermoplastic resin sheet and the metallic endless belt, which is provided to hold the molten thermoplastic resin sheet pressed by the metallic endless belt.

That is to say, the invention is the producing apparatus used in order to carry out the producing method of the first aspect of the present invention.

A producing apparatus of a thermoplastic resin sheet, relating to a fourth aspect of the present invention, is characterized by providing a first metallic endless belt having a mirror face, which is wound on and between a first cooling roller covered with an elastic member on the surface of the first metallic endless belt; a second metallic endless belt having a mirror face, which is wound on and between a third cooling roller and a fourth cooling roller, in which the first metallic endless belt and the second metallic endless belt are provided to run along side each other to sandwich a molten thermoplastic resin sheet; and an added-pressure means for adding pressure to both metallic endless belts in a section where both metallic endless belts run along side each other to sandwich the molten thermoplastic resin sheet.

That is to say, the invention is the producing apparatus in order to carry out the producing method of the second aspect of the present invention.

In the fourth aspect of the present invention, the third cooling roller can be covered with the elastic member on the surface of the third cooling roller.

In the fourth aspect of the present invention, the added-pressure means for adding pressure to both metallic endless belts can be at least a pair of rollers located to sandwich both metallic endless belts.

In the fourth aspect of the present invention, the added-pressure means for adding pressure to both metallic endless belts can be a roller located to cause both metallic endless belts to curve between the first and second rollers or between the third and fourth rollers.

In the third aspect of the present invention or the fourth aspect of the present invention, it is advisable that the elastic member is less than 95 degrees, preferably 60 degrees of the hardness (reference to a type of JIS K6301 A).

When the hardness is more than 95 degrees, the elastic force is smaller, so that a resin bank is easily produced when the molten thermoplastic resin sheet is touched either by both the cooling roller and the metallic endless belt or by both of the metallic endless belts at approximately the same time.

Figure 1:
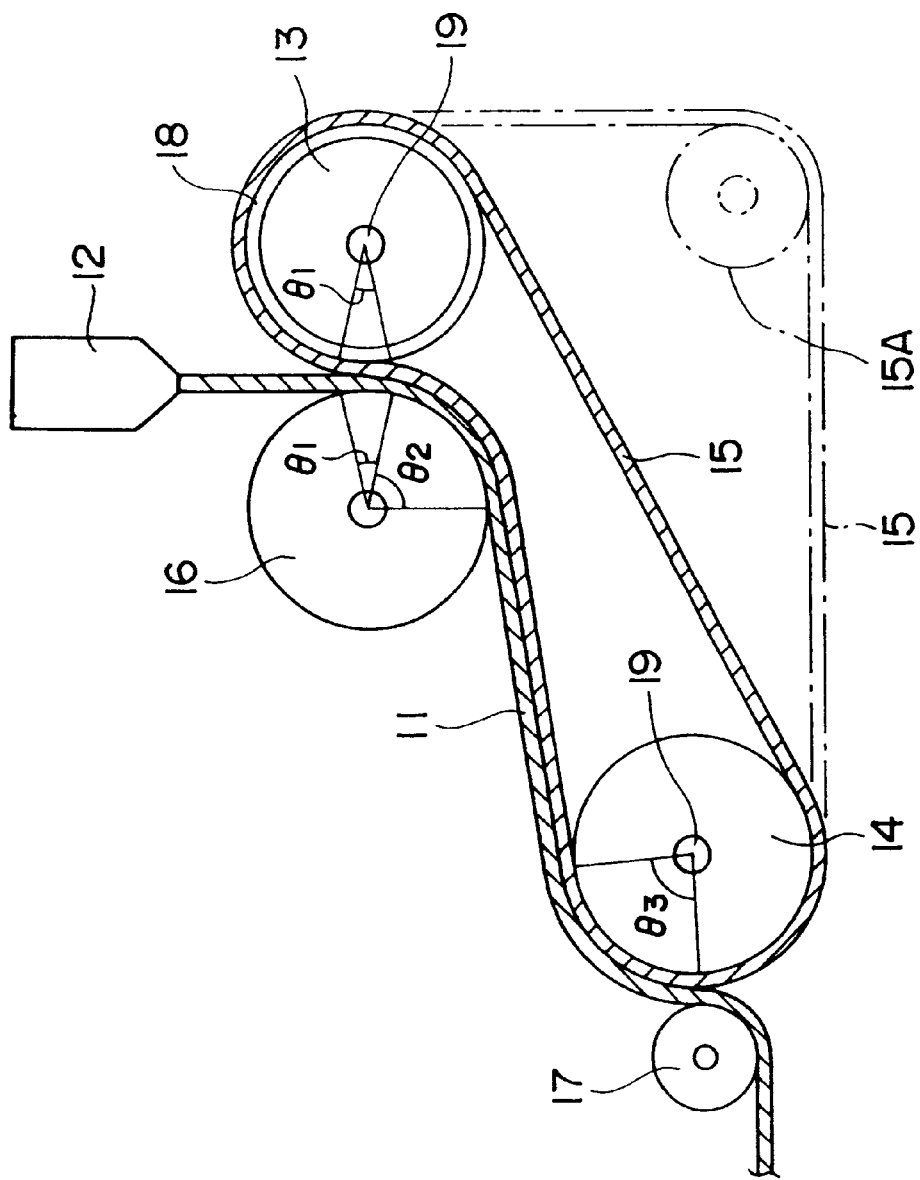
FIG. 1 is a diagrammatic view of a producing apparatus used in a producing method of a thermoplastic resin sheet according to a first embodiment of the present invention.

DETAILED DESCRIPTION OF THE PREFERRED EMBODIMENT(S)
{FIRST EMBODIMENT}

A method and an apparatus for producing a thermoplastic resin sheet 11 according to the present invention will be explained with reference to FIG. 1. In the following description of the present invention, a polypropylene resin is used as a preferable thermoplastic resin.

First of all, a structure of the apparatus for producing the polypropylene resin sheet 11 of the embodiment will be explained.

The producing apparatus is composed of a T-die 12 of an extruder, a metallic endless belt 15 wound on and between a first cooling roller 13 and a second cooling roller 14, a third cooling roller 16 connecting with the first cooling roller 13 through the polypropylene resin sheet 11 and the metallic endless belt 15, and a fourth roller 17 located adjacent to the second cooling roller 14.

Incidentally, as illustrated with a chain line in FIG. 1, the endless belt 15 may be further cooled by touching contact with an additional cooling roller 15A, located in front of the first roller 13, from the inside face of the endless belt 15.

The aforementioned first cooling roller 13 is covered with an elastic member 18, such as fluorine-type rubber or the like, on its surface. The elastic member 18 is less than 95 degrees, preferably 60 degrees of the hardness (reference to a type of JIS K6301 A) and more than 5 mm in thickness.

The metallic endless belt 15 is made of stainless steel or the like, having a mirror face of less than 0.4 S of the surface roughness.

A rotating shaft 19 of at least one of the first and second cooling rollers 13 and 14 is coupled with a rotation driving means (not shown).

The aforementioned third cooling roller 16 also has a mirror face of less than 0.5 S of the surface roughness. The third cooling roller 16 touches the first cooling roller 13 through the polypropylene resin sheet 11 and the metallic endless belt 15, and further, is provided to hold therein the polypropylene resin sheet 11 which is pressed onto the side of the third cooling roller 16 by the endless belt 15. That is to say, the metallic endless belt 15 and the polypropylene resin sheet 11 touching the endless belt 15 curve to wind onto a part of the circumferential face of the third cooling roller 16.

The aforementioned fourth roller 17 guides the resin sheet 11 so that the polypropylene resin sheet 11 can be touch-rolled through the endless belt 15 to the second cooling roller 14.

Each of the aforementioned cooling rollers 13, 14 and 16 is provided with a temperature adjustment means (not shown), such as a water-cooling type, capable of adjusting the temperature of the surface.

A method for producing the polypropylene resin sheet 11 of the embodiment using the aforementioned producing apparatus will be explained below.

First, the temperature of each of the cooling rollers 13, 14 and 16 is controlled so that the surface temperatures of the metallic endless belt 15 and the third cooling roller 16, which are directly touched to the polypropylene resin sheet 11, can be retained to be less than 50° C. and more than the dew-point.

And, the polypropylene resin sheet 11 extruded from the T-die 12 of the extruder is guided into the area between the first and third cooling rollers 13 and 16 to touch with the endless belt 15, touching with the first cooling roller 13, and the third cooling roller 13 at approximately the same time, so that the resin sheet 11 is cooled to be less than 50° C. by being touch-rolled by the first and third cooling rollers 13 and 16. At this time, the elastic member 18 is elastically deformed by being compressed by a pressing force between the first and third cooling rollers 13 and 16, and further the resin sheet 11 is touch-rolled on its face by both of the rollers 13 and 16 in an area of an angle θ1 from the center of each of the rollers 13 and 16 on which the elastic materials are elastically deformed. The elastic member 18 is elastically deformed by the pressing force between the third cooling roller along a nip width (a length in MD (machine direction) of an elastically deformed area of the elastic member) of more than or the same as 5 mm. The face pressure at this time is 0.1 MPa-20.0 MPa.

Continuously, the polypropylene resin sheet 11 is cooled to be less than 50° C. by being touch-rolled onto the third cooling roller 16 by the endless belt 15 having a mirror face. The resin sheet 11, pressed against the cooling roller 16 by the endless belt 15, is held with the cooling roller 16 at an angle θ2 from the center of the cooling roller 16, so that the resin sheet 11 is touch-rolled on its face with the endless belt 15 and the third cooling roller 16 in the area of the holding angle θ2. The face pressure at this time is 0.01 MPa-0.5 MPa.

Further, the polypropylene resin sheet 11 is moved to the second cooling roller 14 with the rotation of the endless belt 15 during the state the resin sheet 11 is along the endless belt 15 to lie on top of the other, and the resin sheet 11 is cooled to be less than 50° C. by being touch-rolled to the second cooling roller 14 through the endless belt 15, and separated thereafter. The resin sheet 11, pressed toward the cooling roller 14 by being guided by the fourth roller 17, is touch-rolled on its face to the endless belt 15 in an area of an angle θ3 from the center of the cooling roller 14. The face pressure at this time is 0.01 MPa-0.5 MPa.

At this point, the polypropylene resin sheet 11 is moved being retained on the endless belt 15 even after moving out from the nip between the third cooling roller and the endless belt 15.

According to the embodiment, by touch-rolling the face and cooling the sheet 11 with both of the rollers 13 and 16 and the endless belt 15 in the area of the angle θ1 of the first and third rollers 13 and 16 in which the elastic member 18 is elastically deformed, by touch-rolling the face and cooling the sheet 11 with the metallic endless belt 15 and the third cooling roller 16 in the area of the holding angle θ2, and by touch-rolling the face and cooling the sheet 11 with the endless belt 15 and the second cooling roller 14 in the area of the angle θ3, the high-transparent polypropylene resin sheet 11 can be produced at a high-speed.

{SECOND EMBODIMENT}

Figure 2:
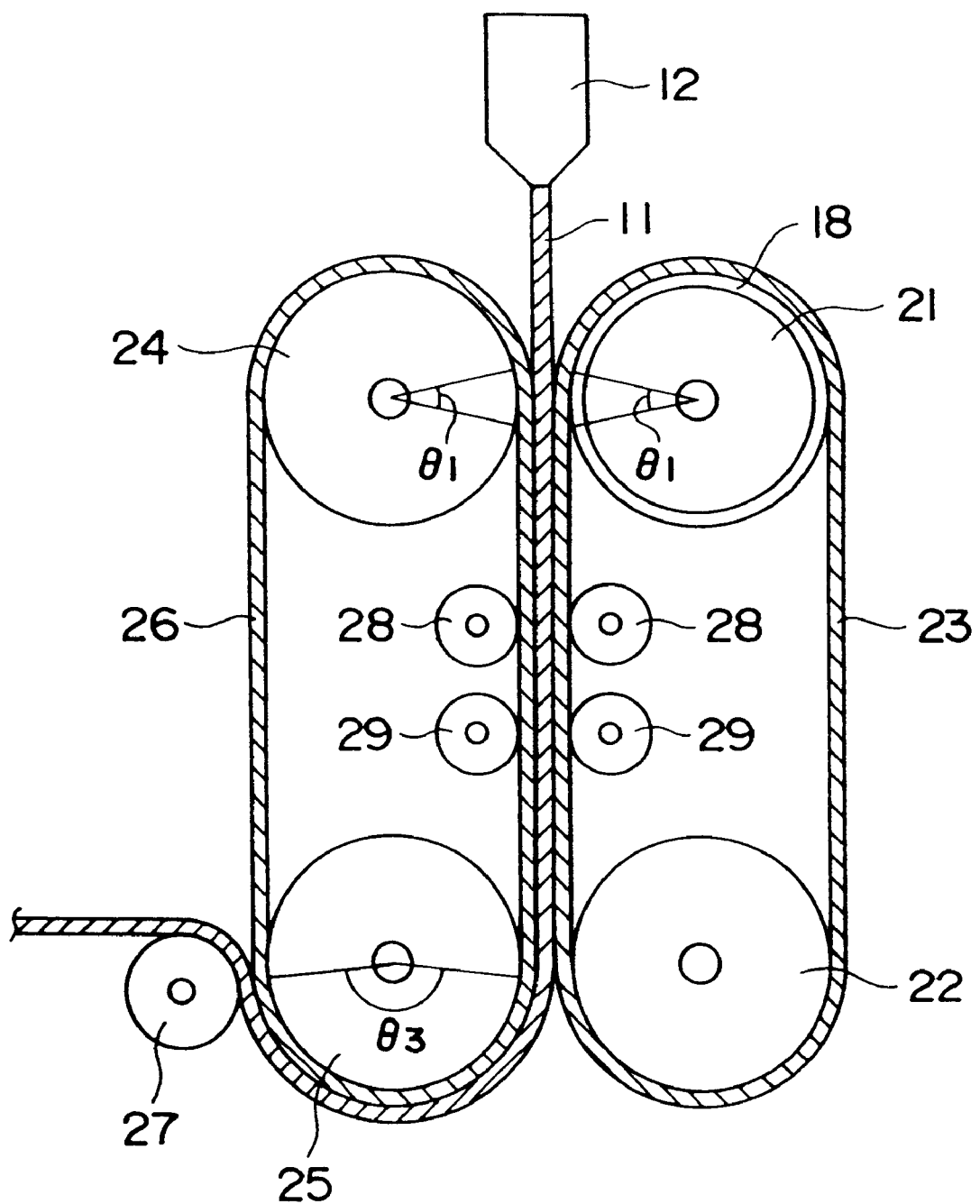
FIG. 2 is a diagrammatic view of a producing apparatus used in a producing method of a thermoplastic resin sheet according to a second embodiment of the present invention.

A preferred embodiment of a producing method and a producing apparatus of the polypropylene resin sheet 11 relating to the embodiment will be explained with reference to FIG. 2.

First of all, a structure of the producing apparatus of the embodiment will be described.

The producing apparatus is composed of the T-die 12 of an extruder, a first metallic endless belt 23 wound on a first cooling roller 21 and a second cooling roller 22, a second metallic endless belt 26 wound on a third cooling roller 24 and a fourth cooling roller 25, a fifth roller 27 provided adjacent to the fourth cooling roller 25, and two pairs of rollers 28 and 29 provided as an added-pressure means to the endless belts 23 and 26.

The aforementioned first cooling roller 21 is covered with the elastic member 18, such as fluorine-type rubber or the like, on its surface. The elastic member 18 is less than 95 degrees, preferably 60 degrees of the hardness (reference to a type of JIS K6301 A) and more than 5 mm in thickness.

The aforementioned first and second metallic endless belts 23 and 26 are provided to run along side each other to sandwich the polypropylene resin sheet 11 between the first and second rollers 21 and 22 and between the third and fourth rollers 24 and 25. The endless belts 23 and 26 are each made of stainless or the like and each have a mirror face of less that 0.5 S of the surface roughness.

Two pairs of rollers 28 and 29, functioning as the adding-pressure means, are provided to face to each other and engage respective remote surfaces of both of the endless belts 23 and 26 in the approximate central position between the first and second rollers 21 and 22 and between the third and fourth rollers 24 and 25. A slight space is provided between the illustrated upper and lower rollers 28 and 29. Incidentally, each of the two pairs of rollers 28 and 29 may be offset located so as to be away from each other and not opposing each other.

The aforementioned fifth roller 27 guides the resin sheet 11 so that the polypropylene resin sheet 11 is touch-rolled onto the fourth cooling roller 25 through the second endless belt 26.

Each of the aforementioned cooling rollers 21, 22, 24, and 25 is provided with a temperature adjustment means (not shown), such as a water-cooling type, capable of adjusting the temperature of the surface.

Next, a producing method of the polypropylene resin sheet 11 of the embodiment using the aforementioned producing apparatus will be explained.

The temperature of each of the cooling rollers 21, 22, 24 and 25 is controlled so that the surface temperature of the metallic endless belts 23 and 26, which are directly touched to the polypropylene resin sheet 11, can be retained to be less than 50° C. and more than the dew-point.

The polypropylene resin sheet 11 extruded from the T-die 12 of the extruder is guided into the area between the first and second metallic endless belts 23 and 26 to touch the first endless belt 23 touching the first cooling roller 21 and the second metallic endless belt 26 touching the third cooling roller 24 at approximately the same time, so that the polypropylene resin sheet 11 is cooled to be less than 50° C. by being touch-rolled with the first and third cooling rollers 21 and 24. At this time, the elastic member 18 is elastically deformed along a nip width (a length in MD (machine direction) of an elastically deformed area of the elastic member) of more than or the same as 5 mm due to being compressed by a pressing force between the first and third cooling rollers 21 and 24, and the resin sheet 11 is touch-rolled on the face by both of the rollers 21 and 24 in an area of an angle θ1 from the center of each of the rollers 21 and 24 on which each elastic member 18 is elastically deformed. The face pressure at this time is 0.1 MPa-20.0 MPa.

Continuously, in a section in which both of the endless belts 23 and 26 run along side each other, the polypropylene resin sheet 11, sandwiched between both endless belts 23 and 26, is touch-rolled with two pairs of rollers 28 and 29 as the adding-pressure means so as to be cooled to be less than 50° C. The resin sheet 11, sandwiched between both endless belts 23 and 26, is touch-rolled on the face by a pressing force with the pairs of rollers 28 and 29 in a section between the upper and lower rollers 28 to 29. The face pressure at this time is 0.01 MPa-0.5 MPa.

Next, the aforementioned polypropylene resin sheet 11 is moved toward the second and fourth cooling rollers 22 and 25 together with the rotation of both endless belts 23 and 26, and the resin sheet 11 touches the fourth cooling roller 25 through the second endless belt 26 so as to be cooled to be less than 50° C. and separated thereafter. The polypropylene resin sheet 11, pressed to the side of the cooling roller 25 by being guided by the fifth roller 27, is touch-rolled on the face to the endless belt 26 in an area of an angle θ3 from the center of the cooling roller 25. The face pressure at this time is 0.01 MPa-0.5 MPa.

According to the embodiment, by touch-rolling the face and cooling the sheet 11 with both of the rollers 21 and 24 and the endless belts 23 and 26 in the area of the angle θ1 of the first roller 21, on which the elastic member 18 is elastically deformed, and the third roller 24, by touch-rolling the face and cooling the sheet 11 between the two pairs of rollers 28 and 29 as the adding-pressure means, and by touch-rolling the face and cooling the sheet 11 by the second metallic endless belt 26 and the fourth cooling roller 25 in the area of the angle θ3, the high-transparent polypropylene resin sheet 11 can be produced at a high-speed.

{THIRD EMBODIMENT}

Figure 3:
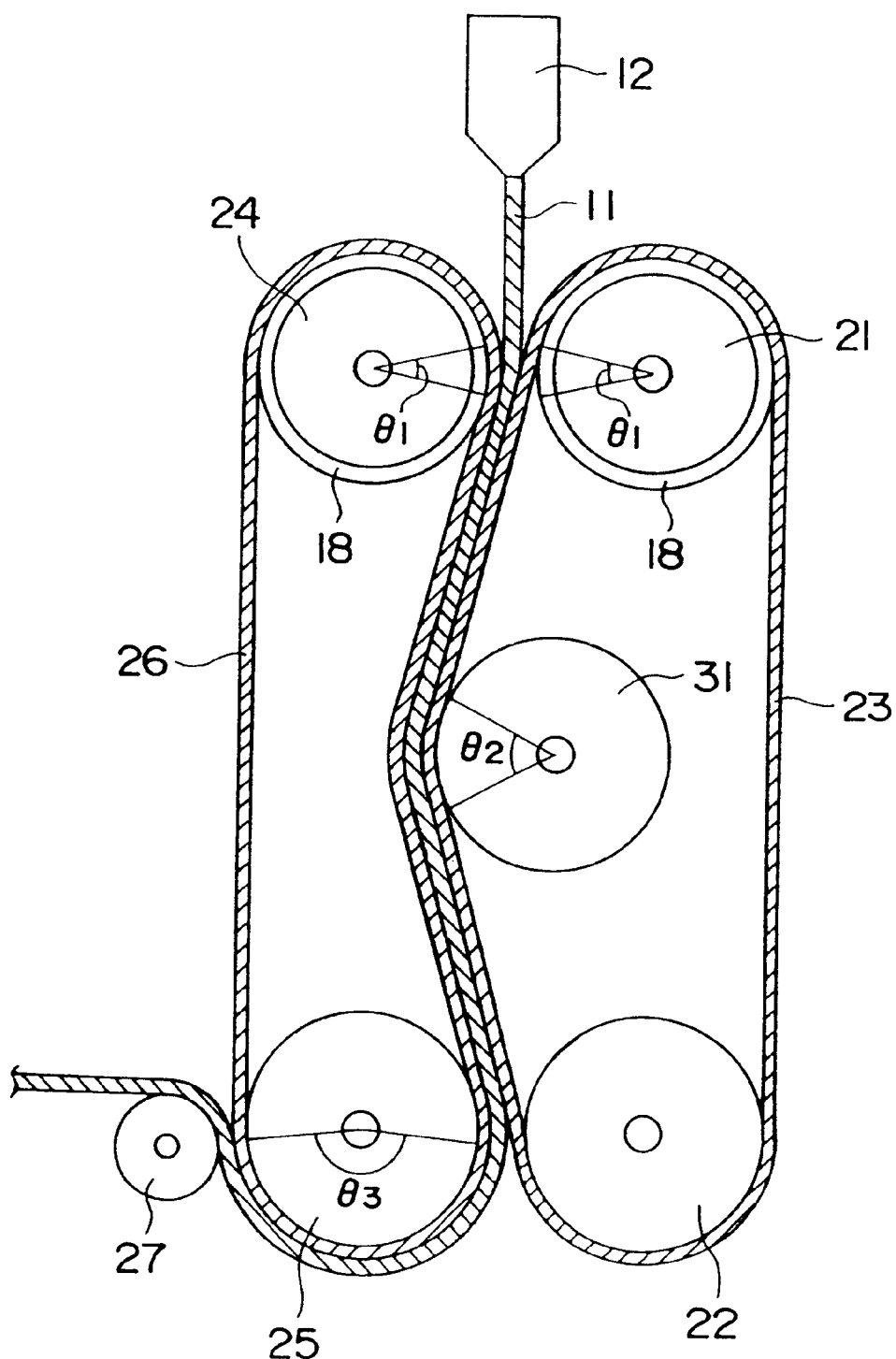
FIG. 3 is a diagrammatic view of a producing apparatus used in a producing method of a thermoplastic resin sheet according to a third embodiment of the present invention.

A preferred embodiment of a producing method and a producing apparatus of the polypropylene resin sheet 11 relating to the embodiment will be explained with reference to FIG. 3.

First of all, a structure of the producing apparatus of the embodiment will be described.

The producing apparatus has the following different points as compared with the producing apparatus of the second embodiment.

In the producing apparatus, the elastic member 18 is also covered on the surface of the third cooling roller 24.

Further, a roller 31 is used as the adding-pressure means to the endless belts 23 and 26, and in the approximate central position between the third and fourth rollers 24 and 25, the roller 31 is provided to cause both metallic endless belts 23 and 26 to curve toward the side of the third and fourth rollers 24 and 25. The roller 31 also has a cooling function.

The producing method of the polypropylene resin sheet 11 using the producing apparatus is the same as the second embodiment, but the only different points are the touch-roll on the face by the first and third rollers 21 and 24, and the touch-roll on the face in a section both of the endless belts 23 and 26 run along side each other.

More specifically, when the polypropylene resin sheet 11 extruded from the T-die 12 is guided into the area between the first and second endless belts 23 and 26 to touch the first endless belt 23 and the second endless belt 26 at approximately the same time, both elastic materials 18 are elastically deformed due to being compressed by a pressing force between the first and third cooling rollers 21 and 24, so that the resin sheet 11 is touch-rolled on the face along a nip width of more than or the same as 5 mm by both of the rollers 21 and 24 in the area of the angle θ1 from the centers of both of the rollers 21 and 24 in which the elastic materials 18 are elastically deformed. The face pressure at this time is 0.1 MPa-20.0 MPa.

When the polypropylene resin sheet 11 is moved from the side of the first and third rollers 21 and 24 to the side of the second and fourth rollers 22 and 25, the polypropylene resin sheet 11 pressed to the side of the aforementioned roller 31 by the second endless belt 26 is held with the roller 31 at the angle θ2, so that the resin sheet 11, sandwiched between the endless belts 23 and 26 in the area of the holding angle θ2, is touched on the face to be pressed to the side of the roller 31. The face pressure at this time is 0.01 MPa-0.5 MPa.

According to the embodiment, by touch-rolling the face and cooling the sheet 11 with both of the rollers 21 and 24 and the endless belts 23 and 26 in the area of the angle θ1 of the first and third rollers 21 and 24 on which both elastic materials 18 are elastically deformed, by touch-rolling the face and cooling the sheet 11 with the second endless belt 26 and the roller 31 as the adding-pressure means in the area of the holding angle θ2, and by touch-rolling the face and cooling the sheet 11 with the second endless bet 26 and the fourth cooling roller 25 in the area of the angle θ3, the high-transparent polypropylene resin sheet 11 can be produced at a high-speed.

{FOURTH EMBODIMENT}

Figure 4:
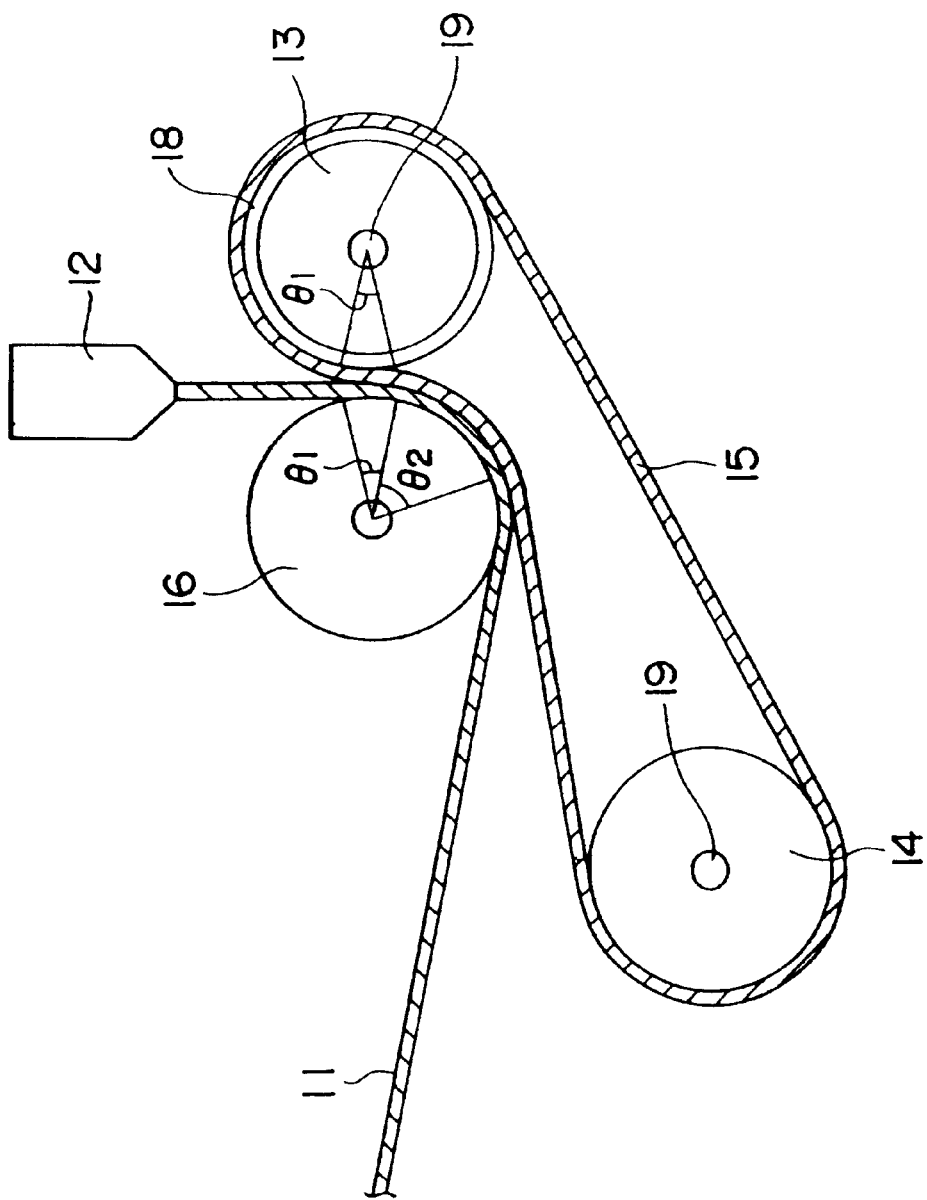
FIG. 4 is a diagrammatic view of a producing apparatus used in a producing method of a thermoplastic resin sheet according to a fourth embodiment of the present invention.

A preferred embodiment of the producing method and the producing apparatus of the polypropylene resin sheet 11 relating to the embodiment will be explained with reference to FIG. 4.

The producing apparatus of the embodiment has the following different points as compared with the producing apparatus of the first embodiment.

The producing apparatus is structured not to be provided with the fourth roller 17 relating to the first embodiment, but to be, similarly, provided with the first cooling roller 13, covered with the elastic member 18, the second cooling roller 14, the metallic endless belt 15 and the third cooling roller 16. The third cooling roller 16, having a mirrored face, is free from contact with other rollers or contact with other rollers through the thickness of the metallic endless belt, except for the elastic member cooling roller.

The producing method of the polypropylene resin sheet 11, using the producing apparatus, is different from the first embodiment in not touching the face to press to the endless belt 15 and not cooling the resin sheet 11 guided by the fourth roller 17 according to the first embodiment.

More specifically, the polypropylene resin sheet 11 extruded from the T-die 12 of the extruder is guided into the area between the first and third rollers 13 and 16 to be touched with the endless belt 15, touched with the first cooling roller 13, and the third cooling roller 16 at approximately the same time, so that the resin sheet 11 is cooled to be less than 50° C. by being touch-rolled with the first and third cooling rollers 13 and 16, and continuously, the polypropylene resin sheet 11 is cooled to be less than 50° C. to be touch-rolled to the third cooling roller 16 by the aforementioned endless belt 15 having a mirror face.

According to the embodiment, by touch-rolling the face and cooling the sheet 11 with both of the rollers 13 and 16 and the endless belt 15 in the area of the angle θ1 of the first and third rollers 13 and 16 on which the elastic member 18 is elastically deformed, and by touch-rolling the face and cooling the sheet 11 with the metallic endless belt 15 and the third cooling roller 16 in the area of the holding angle θ2, the high-transparent polypropylene resin sheet 11 can be produced at a high-speed.

{FIFTH EMBODIMENT}

Figure 5:
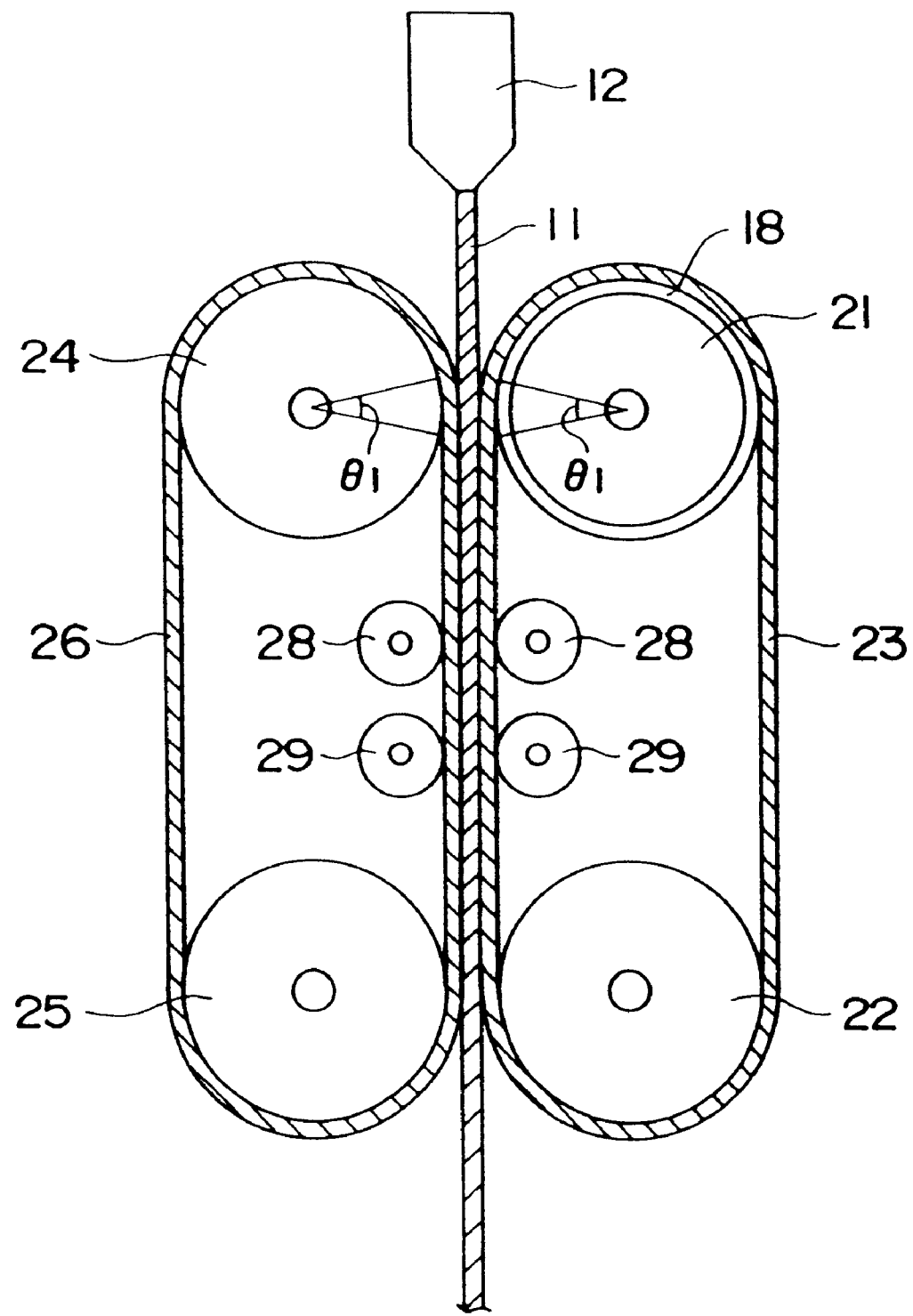
FIG. 5 is a diagrammatic view of a producing apparatus used in a producing method of a thermoplastic resin sheet according to a fifth embodiment of the present invention.

A preferred embodiment of the producing method and the producing apparatus of the polypropylene resin sheet 11 relating to the embodiment will be explained with reference to FIG. 5.

The producing apparatus of the embodiment has the following different points as compared with the producing apparatus of the second embodiment.

The producing apparatus is structured not to be provided with the fifth roller 27 relating to the second embodiment, but to be, similarly, provided with the first cooling roller 21, the second cooling roller 22, the first metallic endless belt 23, the third cooling roller 24, the fourth cooling roller 25, the second metallic endless belt 26 and the two pairs of rollers 28 and 29 provided as the adding-pressure means.

The producing method of the polypropylene resin sheet 11, using the producing apparatus, is different from the second embodiment in not touch-rolling the face and cooling the sheet 11 by the second metallic endless belt 26 and the fourth cooling roller 25.

That is to say, the polypropylene resin sheet 11 extruded from the T-die 12 of the extruder is guided into the area between the first and second metallic endless belts 23 and 26 to touch the first metallic endless belt 23 and the second metallic endless belt 26 at approximately the same time, so that the polypropylene resin sheet 11 is touch-rolled by the first and third cooling rollers 21 and 24 so as to be cooled to be less than 50° C., and continuously, the polypropylene resin sheet 11 sandwiched between both endless belts 23 and 26 is touch-rolled with the two pairs of rollers 28 and 29 to be cooled to be less than 50° C.

According to the embodiment, by touch-rolling the face and cooling the resin sheet 11 with both of the rollers 21 and 24 and the endless belts 23 and 26 in the area of the angle $\theta 1$ of the first and third rollers 21 and 24 on which both elastic materials 18 are elastically deformed, and by touch-rolling the face and cooling the sheet 11 in the section between the two pairs of rollers 28 and 29 as the adding-pressure means, the high-transparent polypropylene resin sheet 11 can be produced at a high-speed.

{EXPERIMENT 1}

In the aforementioned first embodiment, the specific condition of the producing apparatus and the producing method will be defined as below.

The diameter of the extruder . . . 90 mm, the width of the T-die . . . 800 mm.

Polypropylene resin . . . IDEMITSU POLYPRO F-205S (a trade name, made by Idemitsu Petrochemical Co., Ltd.)

The thickness of the polypropylene resin sheet... 0.3 mm

Material of the elastic member . . . silicone rubber, thickness . . . 10 mm, hardness . . . 30 degrees the sheet pull-down speed . . . 16 m/min.

the temperature of the surface of the roller and the endless belt which touch the sheet . . . 20–23° C.

{EXPERIMENT 2}

In the producing method of Experiment 1, only the raw material of the sheet is hanged.

More specifically, the used resin is that IDEMITSU POLYPRO F-205S is added with 3,000 ppm of GELALL DH (made by Shin-Nippon Rikagaku Kabushi-Kaisha) as a nucleating agent.

{COMPARISON 1}

In the producing method (see Japanese Patent Application Laid-open No. 6-170919), in which the metallic endless belt is wound between a metal roller and an elastic roller covered with an elastic body on its surface, and the sheet is inserted into the area between the elastic roller and a cooling roller (80° C.) through the metallic endless belt (80° C.), and then the sheet is touch-rolled and cooled by the cooling roller and the belt after being touch-rolled on a part of the face of the cooling roller, the used raw material of resin is the aforementioned IDEMITSU POLYPRO F-205S.

{COMPARISON 2}

A producing method is the same as Comparison 1, but the used raw material for the sheet is Idemitsu Polypro F-205S which is added with the aforementioned GELALL DH.

{COMPARISON 3}

In the producing method (see German Patent 3319279A1, Japanese Utility Model Application Laid-open No. 3-6919), in which the metallic endless belt (30° C.) is wound between a metal roller (30° C.) and an elastic roller covered with an elastic body on its surface, and the sheet is inserted into the area between the elastic roller and a cooling roller through the metallic endless belt, and then the sheet is touch-rolled on a part of the face of the cooling roller, the used raw material of resin is the aforementioned IDEMITSU POLYPRO F-205S.

As to the aforementioned Experiments 1 and 2 and Comparisons 1 to 3, total haze and inner haze of the obtained polypropylene resin sheet is measured, and the surface glossiness of the face touched to the roller and the other face touched to the belt are measured. The results of the measurements will be described in the following Table 1.

Haze is found, with the use of a haze measuring instrument (e.g., NDH-300A, made by Nippon Denshoku Kougyoh Kabushi-Kaisha), from the following formula with a ratio of a total ray transmittance (Tt) signifying the total amount of rays transmitted by illuminating light on the sheet, and a diffused ray transmittance (Td) of diffused rays diffused by the sheet and transmitted. The aforementioned total ray transmittance (Tt) is the sum of a parallel ray transmittance (Tp) transmitted at the same axis as incident light and the diffused ray transmittance (Td).

Haze (H)=Td/Tt×100

The total haze is found from Tt and Td obtained when light is illuminated on the sheet. The inner haze is measured to eliminate any influence from the outside of the sheet by sandwiching both faces of the sheet with glass plates after silicone oil is coated on both faces of the sheet.

Total haze=inner haze+outer haze

The aforementioned surface glossiness is found from the following, with the use of an automatic colorimetric color-difference meter (e.g., AUD-CH-2 type-45,60, made by Suga Shikenki Kabushiki-Kaisha), from a ratio of reflected pencils $\Psi$ os from the surface of the glass of refractive index 1.567 and reflected pencils $\Psi$ s measured when light is illuminated on the sheet at the incident angle 60 degrees and the reflected light is received at the same angle 60 degrees.

Surface glossiness (Gs)=($\Psi$s/$\Psi$os)×100

TABLE 1

| | Raw material of sheet | Total haze (%)/ inner haze (%) | Surface glossiness (%) roller side | belt side |
|---|---|---|---|---|
| Experiment 1 | polypropylene (PP) | 3.4/2.4 | 148 | 151 |
| Experiment 2 | PP + nucleating agent | 2.4/1.3 | 150 | 150 |
| Comparison 1 | PP | 20.6/18.5 | 137 | 138 |
| Comparison 2 | PP + nucleating agent | 7.6/2.6 | 145 | 149 |
| Comparison 3 | PP | 12.4/6.8 | 147 | 121 |

From Table 1, according to Experiment 1, the polypropylene resin sheet 11 is produced by touch-rolling the face and cooling the sheet 11 with both of the rollers 13 and 16 and the metallic endless belt 15 in the area of the angle $\theta 1$ of the first and third rollers 13 and 16 on which the elastic member 18 is elastically deformed, by touch-rolling the face and cooling the sheet 11 with the metallic endless belt 15 and the third cooling roller 16 in the area of the holding angle $\theta 2$, and by touch-rolling the face and cooling the sheet 11 with the endless belt 15 and the second cooling roller 14 in the area of the angle θ3, with the result that it is understood that the polypropylene resin sheet 11, having low total haze and inner haze but high-transparency, can be obtained even when being produced at a high-speed. Incidentally, it is seen that the surface glossiness is high on both faces of the roller and belt sides.

According to Experiment 2, the obtained polypropylene resin sheet 11 has similar character to Experiment 1, but the haze is slightly further improved than Experiment 1. Therefore, according to the present invention, by adding nucleating agent into the raw material of resin, the transparency of the sheet can be further improved.

On the other hand, according to Comparison 1, sufficient face-pressure is added in the starting point of immediate cooling, so that the fine effect of the immediate cooling is hardly obtained, with the result that the transparency of the obtained sheet is low and also the surface glossiness is low.

According to Comparison 2, by adding the nucleating agent into the raw material of resin, the improvement of the transparency and the surface glossiness of the obtained sheet appears somewhat as compared with Comparison 1.

According to Comparison 3, since a section of face-pressure between the sheet and the metallic endless belt is short, it is understood that the transparency of the obtained sheet is insufficient and the surface glossiness of the face of the belt side of the sheet is low.

The embodiments of the invention in which an exclusive property or privilege is claimed are defined as follows:

1. A method of producing a thermoplastic resin sheet, using a producing apparatus in which a metallic endless belt having a mirror face on a surface thereof is wound on and extends between a first endless belt supporting cooling roller covered with an elastic member and a second endless belt supporting cooling roller spaced from the first cooling roller, and a third cooling roller having a mirror face on a surface thereof and capable of applying pressure to the first cooling roller through a molten thermoplastic resin sheet and the metallic endless belt to hold the molten thermoplastic resin sheet pressed against the metallic endless belt are provided, the method comprising the steps of:

guiding the molten thermoplastic resin sheet into an area between the first endless belt supporting cooling roller and the third cooling roller to approximately simultaneously touch the metallic endless belt and the belt and the third cooling roller;

compressing the resin sheet between the first endless belt supporting cooling roller and the third cooling roller while the temperature of the metallic endless belt, directly touching the molten thermoplastic resin sheet and the third cooling roller touching the molten resin sheet is retained at less than 50° C., while touch-rolling the face and cooling the molten thermoplastic resin sheet along a nip width of at least 5 mm between the first endless belt cooling roller and the third cooling roller while the elastic member is elastically deformed by a compressing force between the first endless belt cooling roller and the third cooling roller; and cooling, subsequently, the molten thermoplastic resin sheet by the touch-rolling on the face of the metallic endless belt against the third cooling roller to cool the molten resin sheet to a temperature less than 50° C. before the sheet leaves the surface of the third cooling roller;

wherein when the molten thermoplastic resin sheet is touch-rolled on the face of the endless belt with the elastic deformation of the elastic member, the face pressure is defined as 0.1 MPa-20.0 MPa; and wherein when the molten thermoplastic resin sheet travels downstream from the first cooling roller, the resin sheet is touch-rolled on the face of the endless belt between only the third cooling roller and the endless belt, with the face pressure defined as 0.01 MPa-0.5 MPa.

2. The method of producing the thermoplastic resin sheet according to claim 1, including the step of removing the resin sheet from the metallic endless belt after the thermoplastic resin sheet moves out of contact with the mirrored face of the third cooling roller.

3. A method of producing a thermoplastic resin sheet, using a producing apparatus in which a driven metallic endless belt having a mirror face on a surface thereof is wound on and extends between a first cooling roller covered with an elastic member and a second cooling roller spaced from the first cooling roller, and a third cooling roller having a mirror face on a surface thereof and touching the first cooling roller through a molten thermoplastic resin sheet and the metallic endless belt to hold the molten thermoplastic resin sheet pressed against the metallic endless belt are provided, the method comprising the steps of:

extruding the molten thermoplastic resin sheet and applying the resin sheet into an area between the first and third cooling rollers to approximately simultaneously touch the metallic endless belt and the third cooling roller and to be compressed by the first cooling roller and the third cooling roller;

maintaining the temperature of the face of the metallic endless belt at less than 50 degrees Celsius by cooling the endless belt with the first and second cooling rollers;

maintaining the temperature of the surface of the third cooling roller at less than 50 degrees Celsius;

advancing the molten thermoplastic resin sheet into a nip width between the metallic endless belt and the third cooling roller;

touch-rolling and cooling the molten thermoplastic resin sheet between the first and third cooling rollers, the elastic member being elastically deformed by a pressing force between the first and third cooling rollers; and touch-rolling the molten thermoplastic sheet, as the sheet advances and travels downstream beyond the first cooling roller, between only the third cooling roller and the metallic belt, wherein the thermoplastic resin sheet has a temperature of less than 50° C. before the resin sheet leaves the surface of the third cooling roller.

4. The method of producing the thermoplastic resin sheet according to claim 3, including the step of retaining the temperature of the surface of the first cooling roller at less than 50 degrees Celsius.

5. The method of producing the thermoplastic resin sheet according to claim 4, wherein the step of retaining the temperature of the surface of the first cooling roller at less than 50 degrees Celsius includes retaining the surface at a temperature greater than the dew point.

6. The method of producing the thermoplastic resin sheet according to claim 4, wherein the cooling step for the first cooling roller utilizes a water cooling arrangement for adjusting the temperature at the surface of the first cooling roller.

7. The method of producing the thermoplastic resin sheet according to claim 3, including providing a fourth roller facing the second cooling roller to enable cooling of the resin sheet therebetween.

8. The method of producing the thermoplastic resin sheet according to claim 7, including providing a fifth cooling roller along a return path between the second and first cooling rollers to cool and support the metallic belt.

9. The method of producing the thermoplastic resin sheet according to claim 3, wherein the step of maintaining the temperature of the face of the metallic endless belt at less than 50 degrees Celsius includes retaining the face at a temperature greater than the dew-point, the step of maintaining the temperature of a surface of the third cooling roller at less than 50 degrees Celsius includes retaining the surface at a temperature greater than the dew point, and a nip width of at least 5 mm is between the first cooling roller and the third cooling roller while the elastic member is elastically deformed.

10. The method of producing the thermoplastic resin sheet according to claim 3, including the step of removing the resin sheet from the metallic endless belt after the thermoplastic resin sheet moves out of contact with the mirrored face of the third cooling roller.

11. A method of producing a thermoplastic resin sheet, using a producing apparatus in which a driven metallic endless belt having a mirror face on a surface thereof is provided and wound on and extends between an elastic member cooling roller covered with an elastic member about a circumference thereof and a metallic endless belt supporting cooling roller, and a mirrored face cooling roller having a mirrored face on a surface about a circumference thereof and capable of applying a pressing force to the elastic member cooling roller through a molten thermoplastic resin sheet pressed against the metallic endless belt, the method comprising the steps of:

extruding a molten thermoplastic resin sheet from a T-die of an extruder;

applying the molten thermoplastic resin sheet into an area between the elastic member cooling roller supporting the metallic endless belt and the mirrored face cooling roller so that the molten thermoplastic resin sheet touches the metallic endless belt and the mirrored face cooling roller approximately simultaneously;

maintaining the temperature of the face of the metallic endless belt at less than 50 degrees Celsius by the elastic member cooling roller cooling the endless belt;

maintaining the temperature of the mirrored face of the mirrored face cooling roller at less than 50 degrees Celsius;

advancing the molten thermoplastic resin sheet between the metallic endless belt and the mirrored face cooling roller, to touch-roll and cool the molten thermoplastic resin sheet therebetween, the elastic member of the elastic member cooling roller being deformed by the pressing force between the elastic member cooling roller and the mirrored face cooling roller; and advancing the thermoplastic resin sheet beyond the area where the mirrored face cooling roller contacts the resin sheet, wherein the thermoplastic resin sheet has a temperature of less than 50 degrees Celsius, the mirrored face cooling roller is free from contact with other rollers or contact with other rollers through the thickness of the metallic endless belt, except for the elastic member cooling roller.

* * * * *